United States Patent [19]
Chung

[11] Patent Number: 5,575,731
[45] Date of Patent: Nov. 19, 1996

[54] SPEED CHANGING DEVICE FOR A BICYCLE

[75] Inventor: Chih-Yin Chung, 2F, No. 3, Alley 17 Lane 292, Chi-Hsing Rd., Pei-Tou Dist., Taipei City, Taiwan

[73] Assignees: Chih-Yin Chung, Taiwan; Thian-Chye Ho, Singapore

[21] Appl. No.: 506,301

[22] Filed: Jul. 24, 1995

[51] Int. Cl.$^6$ ...................................... F16H 3/44
[52] U.S. Cl. .............................. 475/307; 74/417; 280/260; 475/269
[58] Field of Search ................................ 74/417; 280/259, 280/260; 475/12, 269, 307

[56] References Cited

U.S. PATENT DOCUMENTS

| | | | |
|---|---|---|---|
| 437,827 | 10/1890 | White | 280/260 |
| 475,307 | 1/1901 | Brady | 475/307 |
| 519,933 | 5/1894 | Swedlund | 475/307 X |
| 587,787 | 8/1897 | Buckler | 475/269 |
| 651,676 | 6/1900 | Storey | 74/417 |

FOREIGN PATENT DOCUMENTS

| | | | |
|---|---|---|---|
| 19226 | 10/1892 | United Kingdom | 280/260 |
| 20707 | 9/1897 | United Kingdom | 280/260 |

*Primary Examiner*—Charles A. Marmor
*Assistant Examiner*—Nathan O. Jensen
*Attorney, Agent, or Firm*—Morgan, Lewis and Bockius LLP

[57] ABSTRACT

A speed changing device for a bicycle includes a tubular shell adapted to be mounted on a bicycle frame of the bicycle, a crank axle extending axially and rotatably through the tubular shell and having two end portions that extend respectively out of the tubular shell, and a gear wheel set disposed in the tubular shell. The gear wheel set includes a connecting shaft extending transversely from an intermediate portion of the crank axle, a driving bevel gear mounted rotatably on the connecting shaft, and first and second driven bevel gears mounted rotatably on the crank axle and disposed respectively on two sides of the connecting shaft. The first and second driven bevel gears mesh respectively with the driving bevel gear, and the first driven bevel gear can be locked selectively to the tubular shell. The driving bevel gear is rotatable about an the connecting shaft and about axis of the crank axle to drive rotatably the second driven bevel gear at a higher speed ratio when the crank axle is rotated while the first driven bevel gear is locked to the tubular shell, than when the first driven bevel gear is not locked to the tubular shell.

7 Claims, 7 Drawing Sheets

SPEED CHANGING DEVICE FOR A BICYCLE

BACKGROUND OF THE INVENTION

1. Field of the Invention

The invention relates to a bicycle, more particularly to a speed changing device for a bicycle.

2. Description of the Related Art

Referring to FIG. 1, a conventional bicycle 1 is shown to comprise a bicycle frame 11, front and rear wheels 12, 13 mounted rotatably and respectively on front and rear ends of the bicycle frame 11, and a transmission mechanism 14 for driving rotatably the rear wheel 13. The transmission mechanism 14 includes a pair of pedal units 141, a driving sprocket unit 142 driven rotatably by the pedal units 141, a driven sprocket unit 143 mounted on the rear wheel 13, and a drive chain 144 trained between the driving sprocket unit 142 and the driven sprocket unit 143. By operating the pedal units 141, the driving sprocket unit 142 and the drive chain 144 rotate, thereby driving the driven sprocket unit 143 to rotate correspondingly the rear wheel 13 and cause the bicycle 1 to move forward.

Referring to FIG. 2, the driving sprocket unit 142 usually includes smaller and larger driving sprockets 1421, 1422, while the driven sprocket unit 143 usually includes a plurality of driven sprockets 1431, 1432, 1433, 1434, 1435 of varying diameters. The drive chain 144 is trained between one of the driving sprockets 1421, 1422 and a selected one of the driven sprockets 1431, 1432, 1433, 1434, 1435 to obtain different gear ratios and permit adjustments in the force that has to be applied to move the bicycle 1 forward, thereby changing correspondingly the speed of the bicycle 1 in accordance with the road conditions or the physical condition of the user.

The drawbacks of the conventional transmission mechanism 14 are as follows:

1. The difference in the diameters of the driving sprockets should not be too large. Otherwise, smooth transfer of the drive chain from the smaller driving sprocket to the larger driving sprocket cannot be accomplished.

2. Proper training of the drive chain between one of the driving sprockets and one of the driven sprockets cannot be conveniently accomplished. When transferring the drive chain from one of the driving sprockets to the adjacent one of the driving sprockets, a small portion of the drive chain is moved to engage initially the adjacent one of the driving sprockets. Then, the pedal units are operated until the drive chain has moved by about a quarter of its length before the transfer operation can be completed. In addition, when training the drive chain on a selected one of the driving sprockets, untimely disengagement of the drive chain from the selected one of the driving sprockets can easily occur due to improper engagement therebetween, thereby resulting in the need for the user to dismount and repeat the transfer operation.

SUMMARY OF THE INVENTION

The object of the present invention is to provide a speed changing device which is to be applied in a bicycle and which can overcome the aforementioned drawbacks that are commonly associated with the conventional bicycle transmission mechanism.

Accordingly, the speed changing device of the present invention is to be installed in a bicycle and comprises:

a tubular shell adapted to be mounted on a bicycle frame of the bicycle;

a crank axle extending axially and rotatably through the tubular shell and having two end portions that extend respectively out of the tubular shell and that are adapted to be mounted with a respective pedal unit thereon;

a gear wheel set disposed in the tubular shell and including a connecting shaft extending transversely from an intermediate portion of the crank axle, a driving bevel gear, unidirectional clutch means for mounting rotatably the driving bevel gear on the connecting shaft and for permitting only unidirectional rotation of the driving bevel gear about the connecting shaft, and first and second driven bevel gears mounted rotatably on the crank axle and disposed respectively on two sides of the connecting shaft, the first and second driven bevel gears meshing respectively with the driving bevel gear, the second driven bevel gear being adapted to be mounted with a driving sprocket of a transmission mechanism of the bicycle thereon; and locking means for locking selectively the first driven bevel gear to the tubular shell, the locking means including a ratchet wheel formed on one side of the first driven bevel gear, and a pawl extending into the tubular shell and movable between a first position, wherein the pawl disengages the ratchet wheel to enable the driving bevel gear to drive rotatably both the first and second driven bevel gears when the crank axle is rotated, and a second position, wherein the pawl engages the ratchet wheel to prevent rotation of the ratchet wheel relative to the tubular shell in a predetermined direction to lock the first driven bevel gear to the tubular shell.

The driving bevel gear is rotatable about the connecting shaft and about an axis of the crank axle to drive rotatably the second driven bevel gear at a faster speed when the crank axle is rotated while the first driven bevel gear is locked to the tubular shell.

The locking means further comprises a manual control unit connected to the pawl for moving the pawl between the first and second positions. The manual control unit includes a control lever adapted to be mounted on the bicycle frame, and a cable having a first end connected to the control lever and a second end connected to the pawl. The control lever is operable manually and selectively to pull the cable to pull correspondingly the pawl from the first position to the second position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
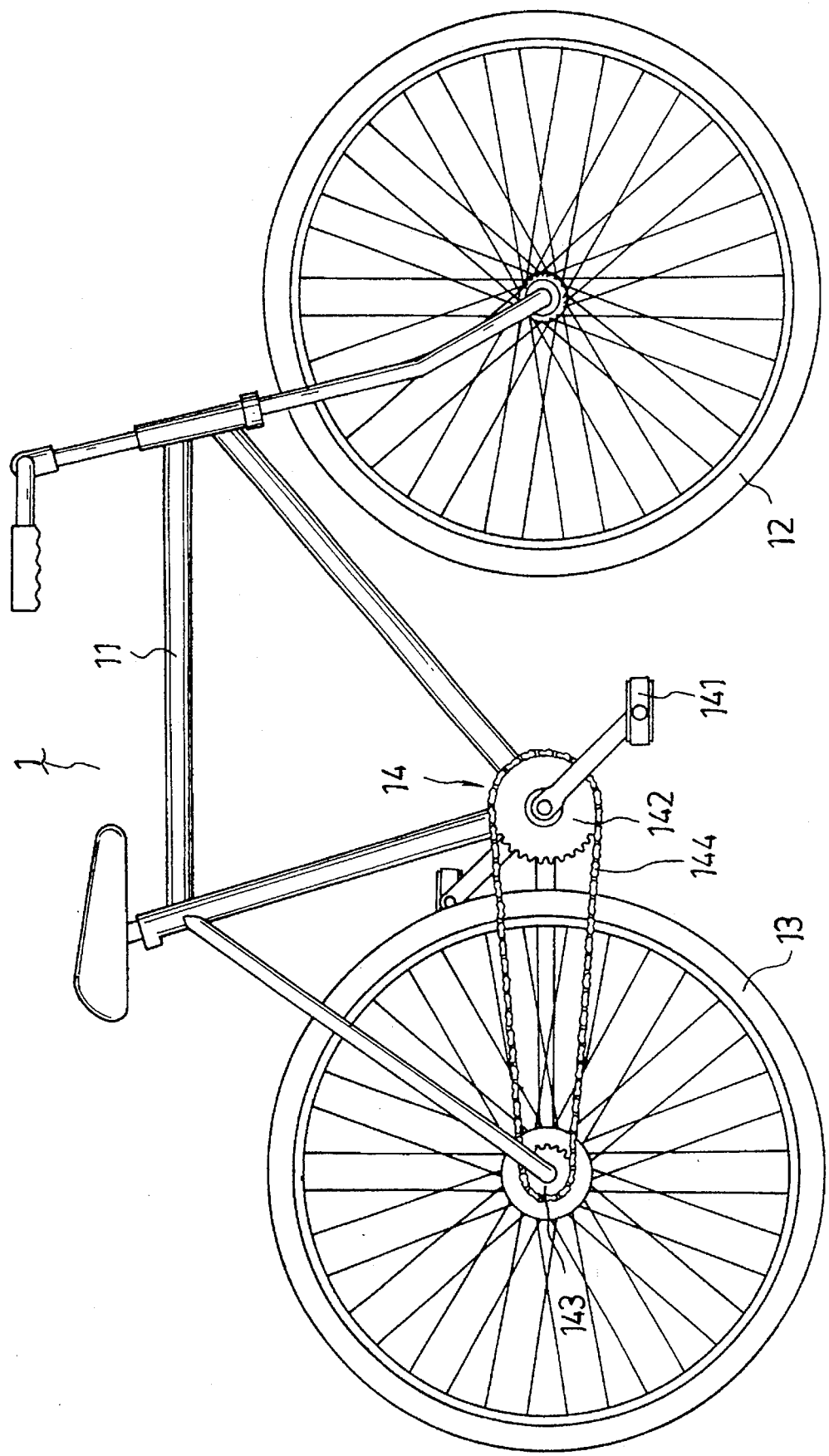
FIG. 1 is a schematic view of a bicycle which incorporates a conventional transmission mechanism.
Figure 2:
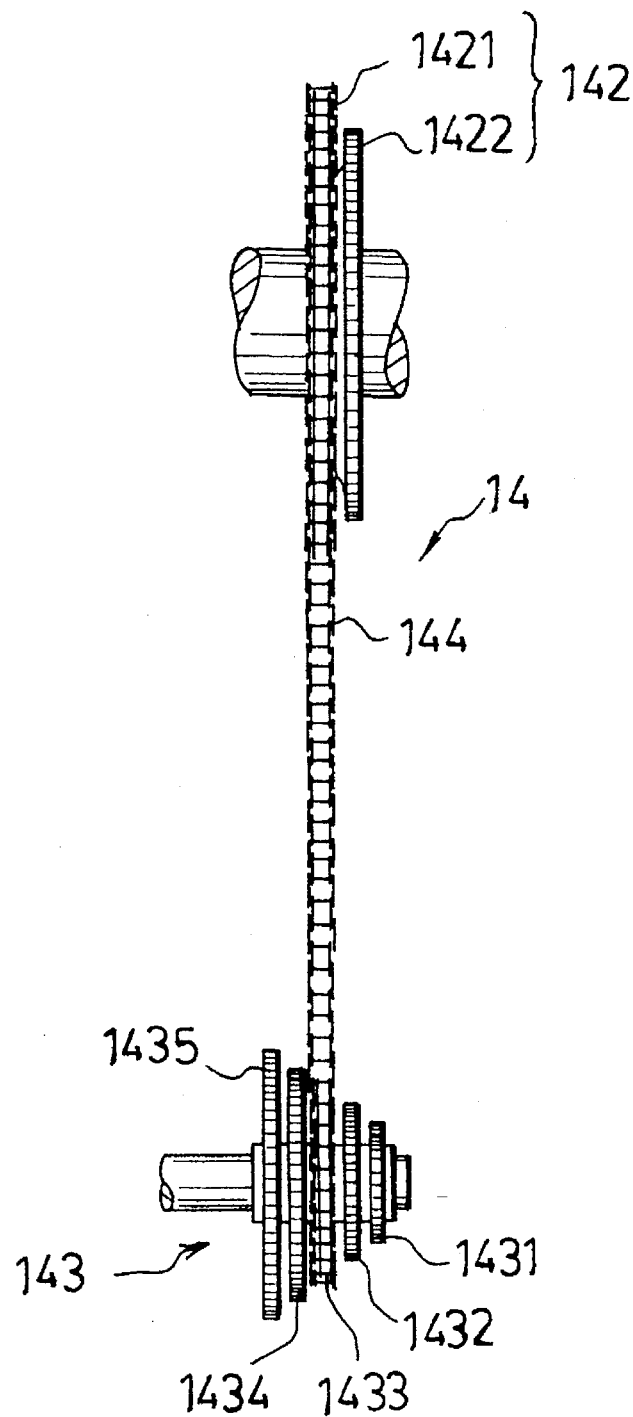
FIG. 2 is a top view of the conventional bicycle transmission mechanism shown in FIG. 1.
Figure 3:
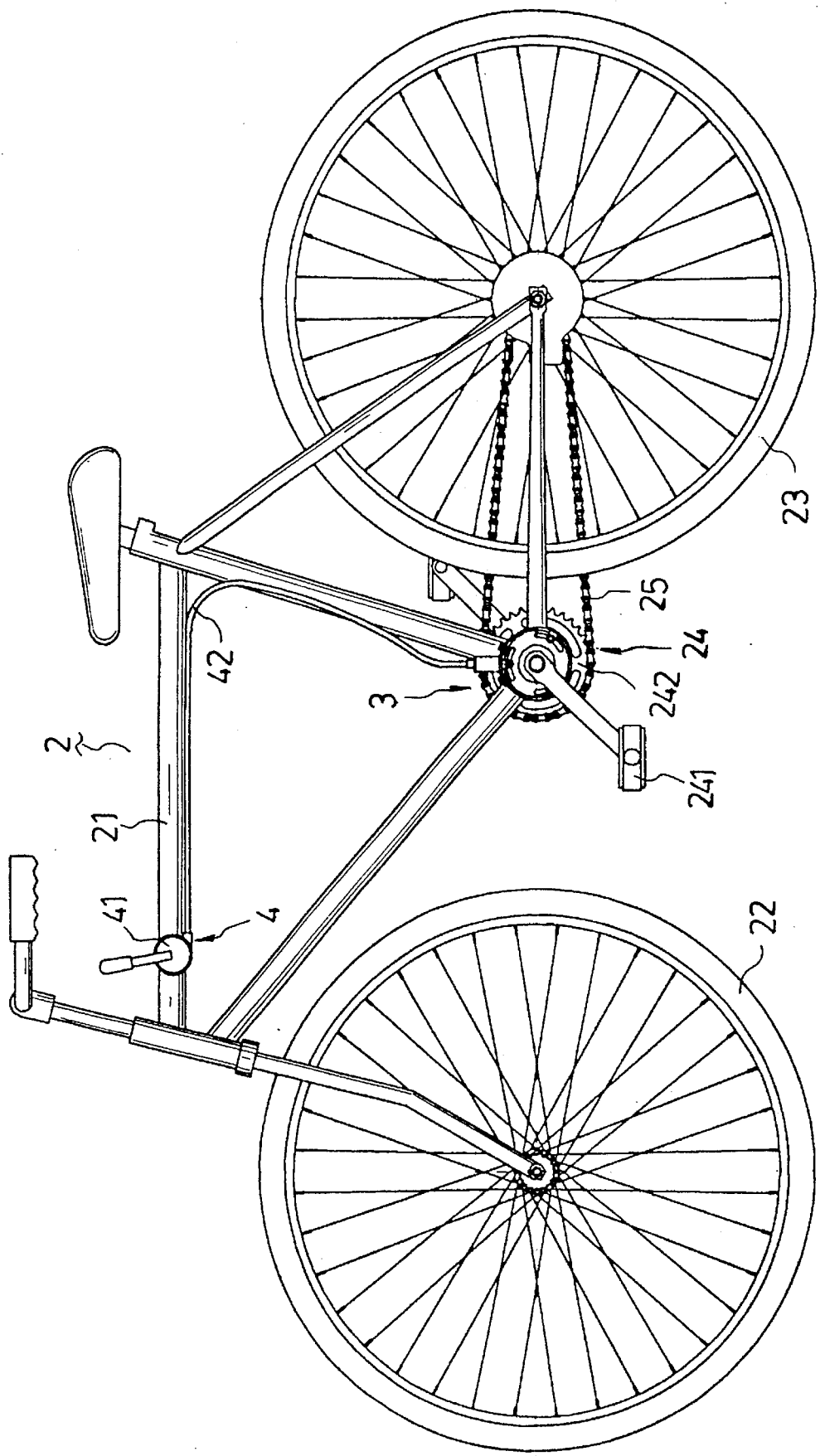
FIG. 3 is a schematic view of a bicycle which incorporates the preferred embodiment of a speed changing device according to the present invention.

Referring to FIG. 3, the speed changing device of the present invention is to be installed in a bicycle 2 which comprises a bicycle frame 21, front and rear wheels 22, 23 mounted rotatably and respectively on front and rear ends of the bicycle frame 21, and a transmission mechanism 24 for driving rotatably the rear wheel 23. The transmission mechanism 24 includes a pair of pedal units 241, a driving sprocket 242 driven rotatably by the pedal units 241, and a drive chain 25 trained between the driving sprocket 242 and a driven sprocket (not shown) mounted on the rear wheel 23.

The speed changing device 3 of the present invention interconnects operably the pedal units 241 and the driving sprocket 242, and is mounted on the bicycle frame 21. The speed changing device 3 comprises a control unit 4 which includes a control lever 41 that is adapted to be mounted on the bicycle frame 21 and a cable 42, such as a steel cable, that has a first end connected to the control lever 41. The control lever 41 is operated when adjusting the force that has to be applied to move the bicycle 2 forward so as to change correspondingly the speed of the bicycle 2 in accordance with the road conditions or the physical condition of the user.

Figure 4:
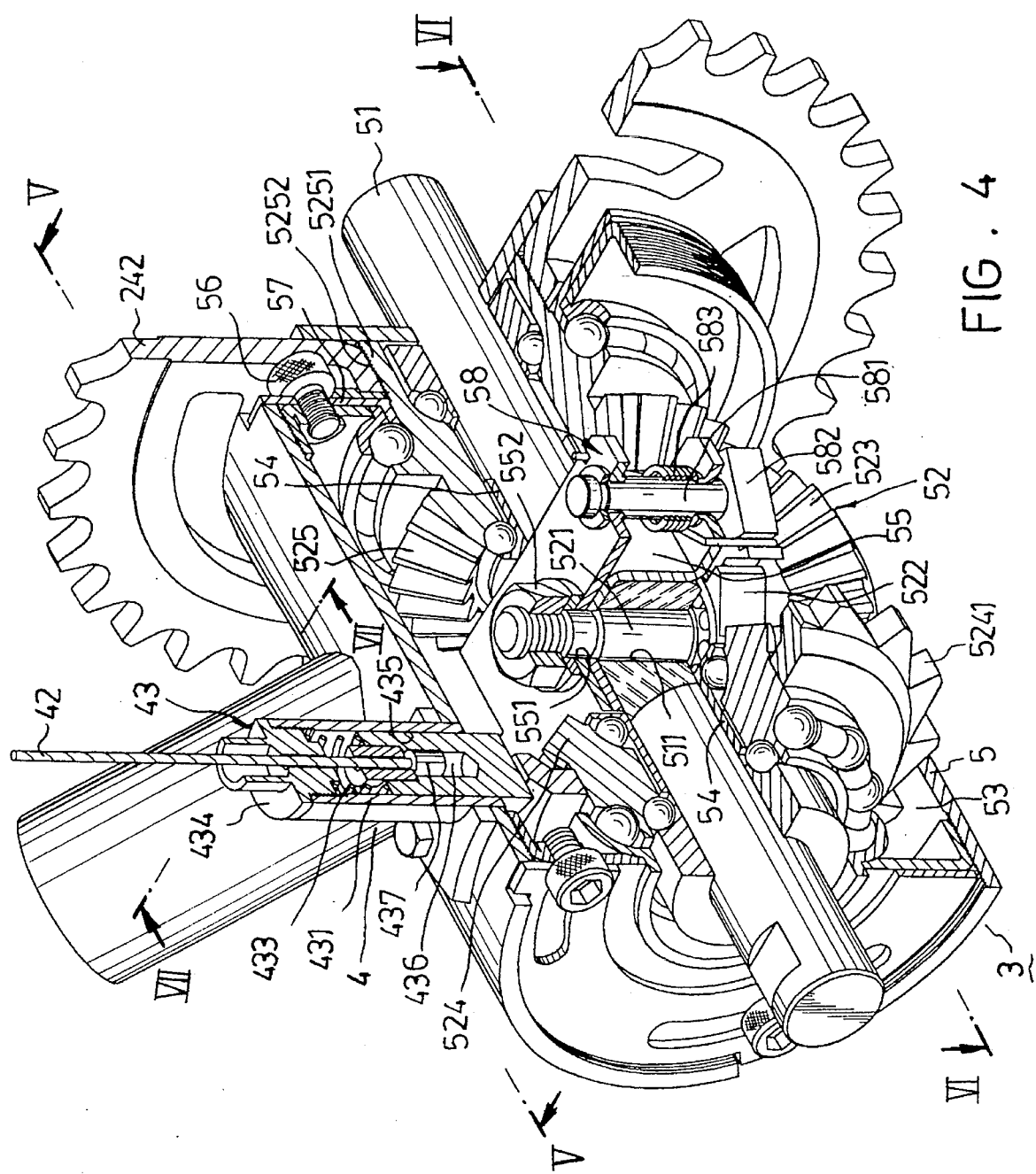
FIG. 4 is a perspective, partly sectional view of the preferred embodiment.
Figure 5:
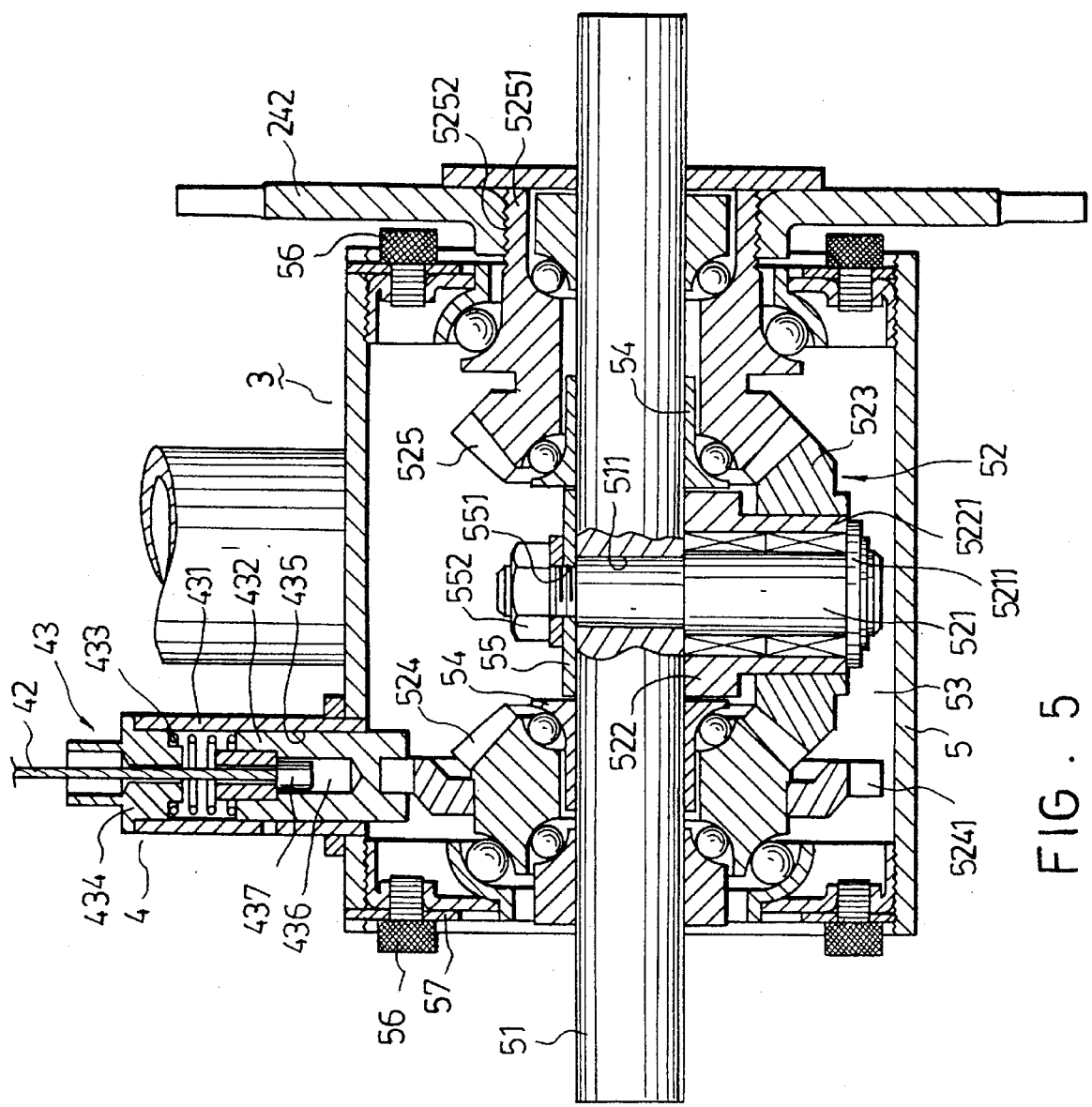
FIG. 5 is a sectional view of the preferred embodiment, taken along line V—V in FIG. 4.

Referring to FIGS. 4 and 5, the speed changing device 3 further comprises a tubular shell 5 adapted to be mounted securely on the bicycle frame 21, a crank axle 51 which extends axially and rotatably through the tubular shell 5, and a gear wheel set 52 which is disposed in the tubular shell 5 and which is connected operably to the crank axle 51.

The tubular shell 5 confines a receiving space 53 and has a plurality of annular bearing seats 54 formed therein. Two cover plates 57 are mounted respectively on two open ends of the tubular shell 5 by means of a plurality of screws 56. When extended through the tubular shell 5, the crank axle 51 is supported rotatably in the tubular shell 5 by the bearing seats 54 and the cover plates 57. The crank axle 51 has two end portions which extend respectively out of the tubular shell 5 and which are adapted to be mounted with a respective one of the pedal units 241 (see FIG. 3) thereon. The crank axle 51 further has an intermediate portion formed with a radial through-hole 511.

The gear wheel set 52 includes a connecting shaft 521 which extends through the through-hole 511 in the crank axle 51, a first ratchet wheel 522 and a driving bevel gear 523 which are mounted rotatably on the connecting shaft 521, and first and second driven bevel gears 524, 525 which are disposed respectively on two sides of the connecting shaft 521. In this embodiment, the first ratchet wheel 522 has one side formed with a tubular extension 5221 and is mounted rotatably on the connecting shaft 521. The driving bevel gear 523 is mounted securely on the tubular extension 5221. The connecting shaft 521 has a first end formed with a radial bearing flange 5211 for supporting rotatably the tubular extension 5221 of the first ratchet wheel 522 thereon. A threaded second end of the connecting shaft 521 extends through a mounting hole 551 that is formed in a mounting plate 55 and engages threadably a nut 552 to mount securely the connecting shaft 521 onto the crank axle 51. Thus, the first ratchet wheel 522 and the driving bevel gear 523 can rotate with the crank axle 51 about the axis of the latter.

The first and second driven bevel gears 524, 525 are mounted rotatably on the crank axle 51 and mesh respectively with the driving bevel gear 523. The first driven bevel gear 524 further has a second ratchet wheel 5241 formed on one side thereof. The second driven bevel gear 525 is formed with a tubular axial extension 5251 which extends out of the tubular shell 5. The axial extension 5251 is formed with an external screw thread 5252 for mounting the driving sprocket 242 of the bicycle transmission mechanism 24 (see FIG. 3) thereon. Thus, rotation of the second driven bevel gear 525 will result in corresponding rotation of the driving sprocket 242.

Figure 6:
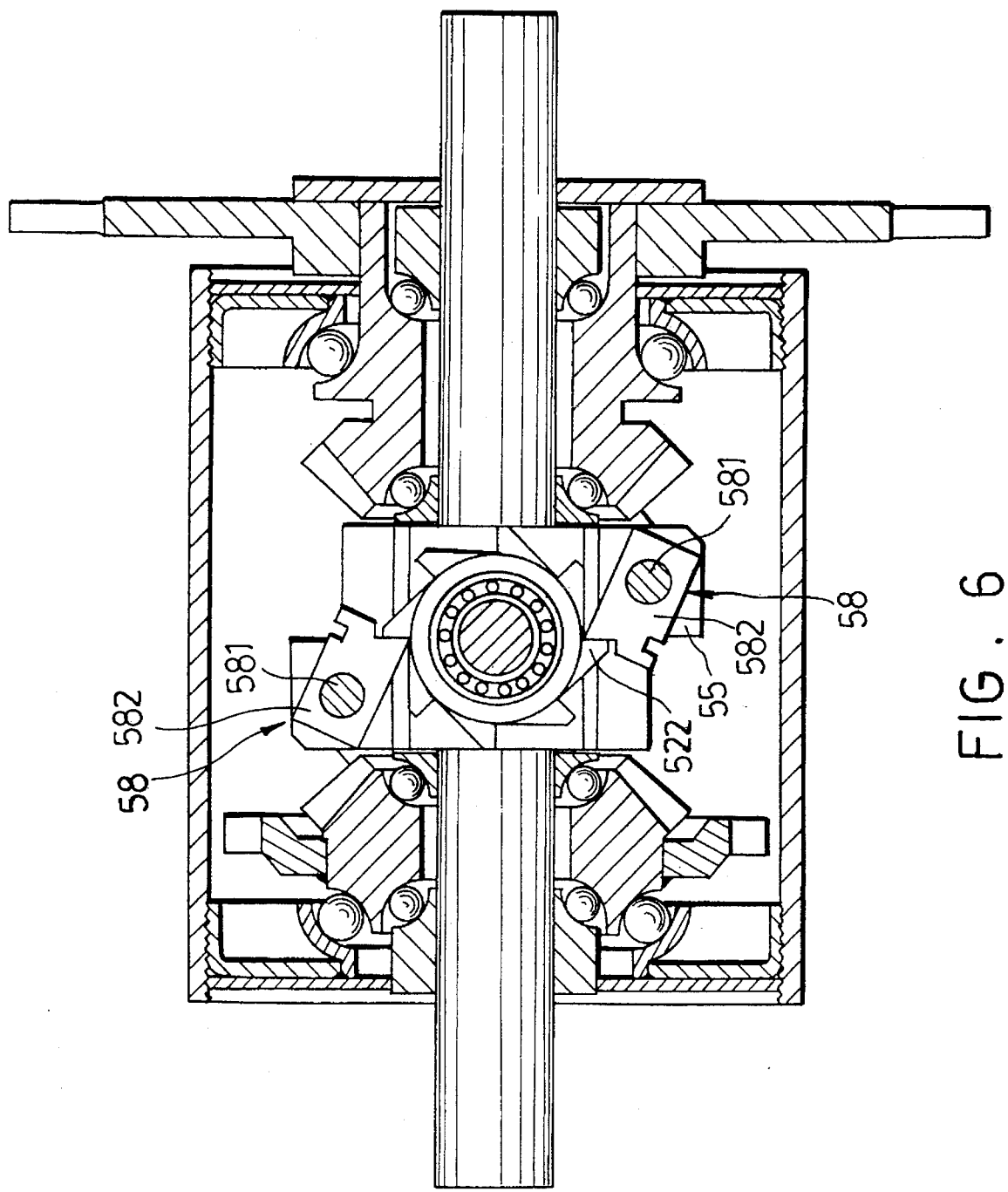
FIG. 6 is a sectional view of the preferred embodiment, taken along line VI—VI in FIG. 4.

Referring to FIGS. 4 and 6, a pair of first pawl units 58 are mounted on the mounting plate 55 and engage operably the first ratchet wheel 522 so as to permit only unidirectional rotation of the latter about the connecting shaft 521. Thus, the first ratchet wheel 522 and the first pawl units 58 act as a unidirectional clutch that permits only unidirectional rotation of the driving bevel gear 523 about the connecting shaft 521. Each of the first pawl units 58 includes a pin 581 parallel to the connecting shaft 521 and mounted rotatably on the mounting plate 55, a pawl 582 mounted securely on a distal end of the pin 581, and a coil spring 583 sleeved on the pin 581 and having a first end secured to the mounting plate 55 and a second end secured to the pawl 582.

Referring once more to FIGS. 3, 4, and 5, the control unit 4 further includes a second pawl unit 43 which is connected operably to the cable 42. The second pawl unit 43 includes a tubular casing 431 which projects radially from the tubular shell 5 and which confines a receiving space 435 for receiving a pawl 432 and a spring 433 therein. The casing 431 has a distal end with a stopper 434 mounted therein. The pawl 432 is disposed slidably in the casing 431 and has one end formed with a blind hole 436. A connector 437 is disposed slidably in the blind hole 436. The cable 42 has a second end which extends through the stopper 434 and into the blind hole 436 for connection with the connector 437. The spring 433 is disposed between the stopper 434 and the pawl 432 to bias the latter to extend into the receiving space 53 that is confined by the tubular shell 5 and engage the second ratchet wheel 5241 to permit only unidirectional rotation of the latter.

Figure 7:
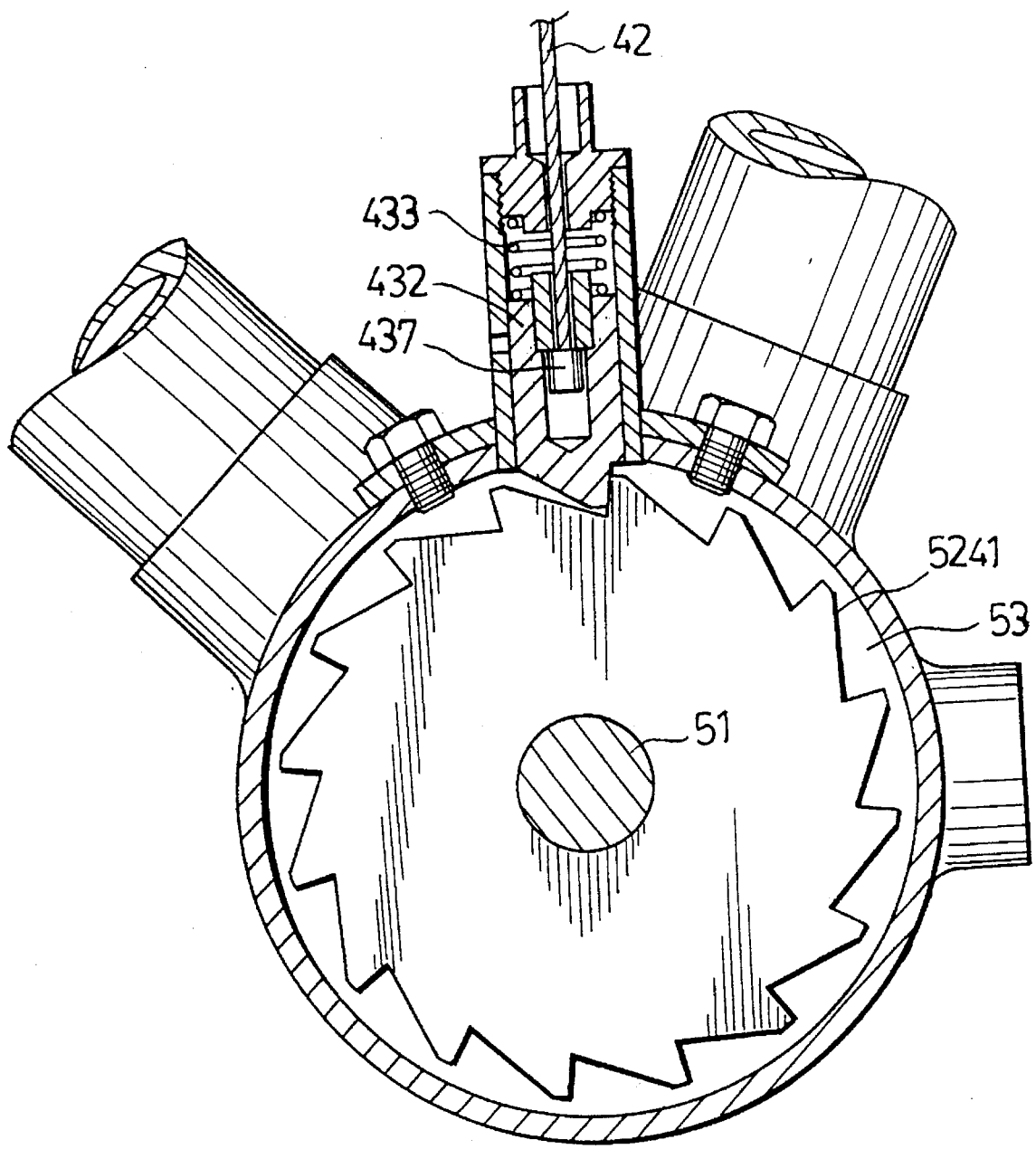
FIG. 7 is a sectional view of the preferred embodiment, taken along line VII—VII in FIG. 4.

The control unit 4 and the second ratchet wheel 5241 act as a locking unit for locking selectively the first driven bevel gear 524 to the tubular shell 5. When the control lever 41 is operated so as to pull the cable 42, the connector 437 pulls the pawl 432 to retract the same into the casing 431 and disengage the second ratchet wheel 5241, thereby permitting bidirectional rotation of the second ratchet wheel 5241. The spring 433 is compressed at this time. When the control lever 41 is operated to cease pulling of the cable 42, the connector 437 ceases to pull the pawl 432, and the spring 433 expands to once more bias the pawl 432 to extend into the receiving space 53 and engage the second ratchet wheel 5241, as shown in FIG. 7, to permit only unidirectional rotation of the latter.

The speed changing device of the present invention is operable in any of the following four operating states:

1. Referring again to FIGS. 3, 4 and 5, when the control lever 41 is operated so as to pull the cable 42, the pawl 432 disengages the second ratchet wheel 5241 to permit bidirectional rotation of the second ratchet wheel 5241. When the pedal units 241 are operated to rotate the crank axle 51 in a counterclockwise direction, the driving bevel gear 523 rotates with the crank axle 51 about the axis of the latter. Since the first ratchet wheel 522 and the first pawl units 58 act as a unidirectional clutch that permits only clockwise rotation of the driving bevel gear 523 about the connecting shaft 521, the driving bevel gear 523 does not rotate about the connecting shaft 521 at this time. Assuming that the sizes of the driving and driven bevel gears 523, 524, 525 are equal, the driving bevel gear 523 rotates the second driven bevel gear 525 at a speed ratio of 1:1. That is to say, the second driven bevel gear 525 rotates at a speed equal to the rotating speed of the crank axle 51. Since the driving sprocket 242 is mounted on the second driven bevel gear 525, rotation of the driving sprocket 242 will enable the drive chain 25 to drive rotatably the driven sprocket (not shown) on the rear wheel 23, thus resulting in forward movement of the bicycle 2.

2. When the control lever 41 is operated so as to disengage the pawl 432 from the second ratchet wheel 5241, operation of the pedal units 241 in a clockwise direction will also cause the driving bevel gear 523 to rotate with the crank axle 51 about the axis of the latter. The first ratchet wheel 522 and the first pawl units 58 permit only clockwise rotation of the driving bevel gear 523 about the connecting shaft 521 and thus, the driving bevel gear 523 does not rotate about the connecting shaft 521 at this time. Rotation of the driving bevel gear 523 will cause the second driven bevel gear 525 to rotate. Since the rear wheel 23 should be driven to rotate in only one direction, operation of the pedal units 241 in the clockwise direction should result in free rotation of the driven sprocket (not shown). That is, the driven sprocket must be unable to drive rotatably the rear wheel 23 at this time. The unidirectional connection between the driven sprocket and the rear wheel 23 is known in the art and will not be detailed herein.

3. When the control lever 41 is operated so that the cable 42 ceases to pull the pawl 432, the pawl 432 engages the second ratchet wheel 5241 to permit only clockwise rotation of the latter. When the pedal units 241 are operated to rotate the crank axle 51 in a counterclockwise direction, the driving bevel gear 523 rotates with the crank axle 51 about the axis of the latter. However, since the pawl 432 prevents the second ratchet wheel 5241 and the first driven bevel gear 524 from rotating with the crank axle 51 in the counterclockwise direction, thus locking the first driven bevel gear 524 to the tubular shell 5, the driving bevel gear 523 is driven to rotate about the connecting shaft 521. Assuming that the sizes of the driving and driven bevel gears 523, 524, 525 are equal, the driving bevel gear 523 rotates the second driven bevel gear 525 at a speed ratio of 2:1. That is to say, the second driven bevel gear 525 rotates at twice the rotating speed of the crank axle 51. Since the driving sprocket 242 is mounted on the second driven bevel gear 525, rotation of the driving sprocket 242 will enable the drive chain 25 to drive rotatably the driven sprocket (not shown) on the rear wheel 23.

4. When the control lever 41 is operated so as to enable the pawl 432 to engage the second ratchet wheel 5241, operation of the pedal units 241 in a clockwise direction will also cause the driving bevel gear 523 to rotate with the crank axle 51 about the axis of the latter. However, the pawl 432 permits rotation of the second ratchet wheel 5241 and the first driven bevel gear 524 with the crank axle 51 in the clockwise direction, and since the first ratchet wheel 522 and the first pawl units 58 only permit clockwise rotation of the driving bevel gear 523 about the connecting shaft 521, the driving bevel gear 523 does not rotate about the connecting shaft 521 at this time. The driving bevel gear 523 then drives the second driven bevel gear 525 to rotate. As mentioned beforehand, since the rear wheel 23 should be driven to rotate in only one direction, operation of the pedal units 241 in the clockwise direction results in free rotation of the driven sprocket (not shown) to prevent the driven sprocket from driving rotatably the rear wheel 23 at this time It has thus been shown that the speed changing device 3 of the present invention can obviate the need to install smaller and larger driving sprockets to achieve different gear ratios. In addition, changing of the gear ratio can be achieved by mere manipulation of the control lever 41. The object of the present invention is thus achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A speed changing device for a bicycle, comprising:

a tubular shell mounted on a bicycle frame of the bicycle;

a crank axle extending axially and rotatably through said tubular shell and having two end portions that extend respectively out of said tubular shell;

a gear wheel set disposed in said tubular shell and including a connecting shaft extending transversely from an intermediate portion of said crank axle, a driving bevel gear, unidirectional clutch means for mounting rotatably said driving bevel gear on said connecting shaft and for permitting only unidirectional rotation of said driving bevel gear about said connecting shaft, and first and second driven bevel gears mounted rotatably on said crank axle and disposed respectively on two sides of said connecting shaft, said first and second driven bevel gears meshing respectively with said driving bevel gear; and locking means for locking selectively said first driven bevel gear to said tubular shell;

whereby, said driving bevel gear is rotatable about said connecting shaft and about an axis of said crank axle to drive rotatably said second driven bevel gear at a higher speed ratio when said crank axle is rotated while said first driven bevel gear is locked to said tubular shell, than when the first driven bevel gear is not locked to the tubular shell.

2. The speed changing device as claimed in claim 1, wherein each of said two end portions of said crank axle is mounted with a respective pedal unit thereon, and said second driven bevel gear is adapted to be mounted with a driving sprocket of a transmission mechanism of the bicycle.

3. The speed changing device as claimed in claim 1, wherein said locking means comprises:

a ratchet wheel formed on one side of said first driven bevel gear; and a pawl extending into said tubular shell and movable between a first position, wherein said pawl disengages said ratchet wheel to enable said driving bevel gear to drive rotatably both said first and second driven bevel gears when said crank axle is rotated, and a second position, wherein said pawl engages said ratchet wheel to prevent rotation of said ratchet wheel relative to said tubular shell in a predetermined direction to lock said first driven bevel gear to said tubular shell.

4. The speed changing device as claimed in claim 3, wherein said locking means further comprises a manual control unit connected to said pawl for moving said pawl between said first and second positions.

5. The speed changing device as claimed in claim 4, wherein said manual control unit includes a control lever adapted to be mounted on the bicycle frame, and a cable having a first end connected to said control lever and a second end connected to said pawl, said control lever being operable manually and selectively to pull said cable to pull correspondingly said pawl from said first position to said second position.

6. The speed changing device as claimed in claim 5, wherein said locking means further comprises:

a tubular casing which projects radially from said tubular shell and which confines a receiving space for receiving slidably said pawl therein, said casing having a distal end with a stopper mounted therein, said second end of said cable extending through said stopper and being connected to one end of said pawl; and a spring disposed in said casing between said stopper and said pawl, said spring biasing said pawl to extend into said tubular shell so as to be in said first position.

7. The speed changing device as claimed in claim 6, wherein said one end of said pawl is formed with a blind hole with a connector disposed slidably therein, said second end of said cable extending into said blind hole and being connected to said connector.

* * * * *